Figure 1:
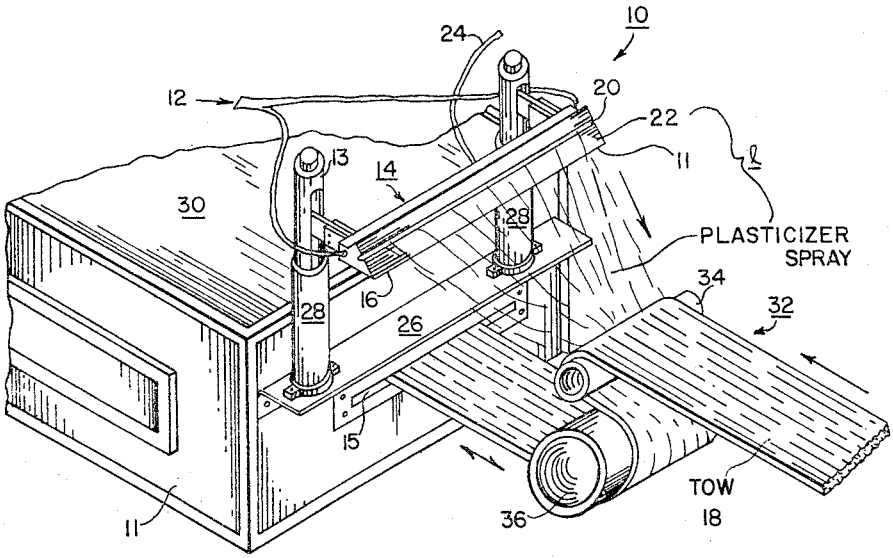
Figure 2:
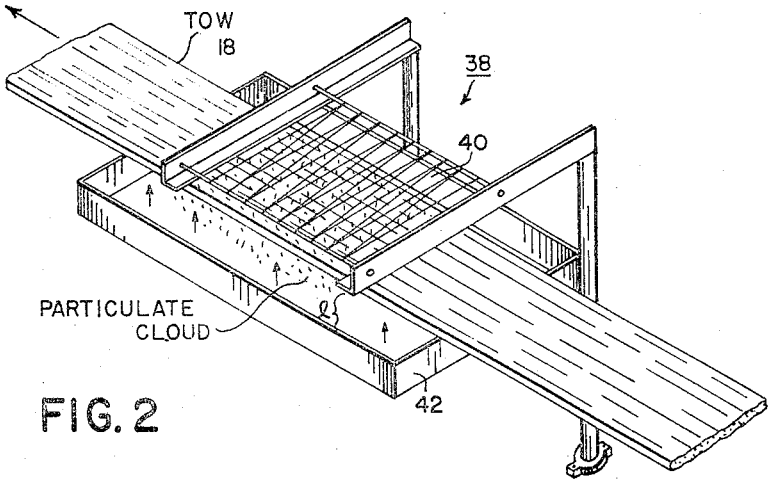

T 860,009

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MARCH 18, 1969

860 O.G. 679

665,476

ELECTROSTATIC PROCESS AND APPARATUS FOR APPLYING MATERIALS TO TOBACCO SMOKE FILTER TOW

Kyle E. Morrison and William E. Morrell, both of P.O. Box 511, Kingsport, Tenn. 37662

Filed Sept. 5, 1967. Published Mar. 18, 1969

Class 117—17

1 Sheet Drawing. 16 Pages Specification

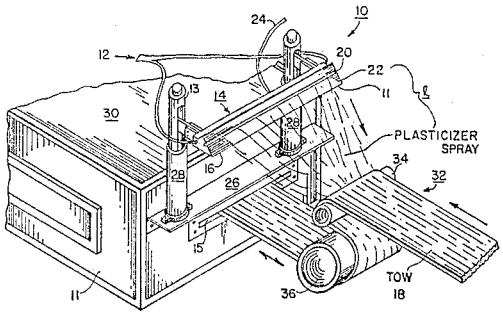

An electrostatic process and apparatus for applying materials to tobacco smoke filter tow wherein the material is introduced into an electrostatic field and is attached to the tow passing through the field. In order to attach a material such as liquids and/or solid particulate matter to the filter tow, the material is passed over the edge of a charged surface which is at a high electrical potential with respect to the closely adjacent tow carrying surface. The material is thus subsequently attracted toward, and deposited on the filter tow. Solid particulate matter can also be attached to the filter tow by introducing the matter into the electrostatic field created between a high potential grid and a grounded surface. The particulate matter is formed into a "cloud" and deposited upwardly onto the filter tow that is passing between the grid and grounded surface.

T860,009

March 18, 1969 K. E. MORRISON ET AL DEF. PUB.

ELECTROSTATIC PROCESS AND APPARATUS FOR APPLYING MATERIALS TO TOBACCO SMOKE FILTER TOW SN - 665476

Filed Sept. 5, 1967

Kyle Eugene Morrison
William Edward Morrell
INVENTORS

BY William T. French
Daniel B. Reece II
ATTORNEYS